United States Patent
Rush et al.

(10) Patent No.: US 6,893,048 B2
(45) Date of Patent: May 17, 2005

(54) FLEXIBLE FENDER MOUNT

(75) Inventors: Randy Charles Rush, Waterloo, IA (US); Rodney Keith Rowland, Waverly, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/612,718

(22) Filed: Jul. 1, 2003

(65) Prior Publication Data

US 2005/0001454 A1 Jan. 6, 2005

(51) Int. Cl.[7] .................................................. E04G 3/00
(52) U.S. Cl. ....................... 280/854; 296/198; 280/154; 280/848
(58) Field of Search .................. 296/198; 280/847–848, 280/154, 851, 854

(56) References Cited

U.S. PATENT DOCUMENTS

| | | | |
|---|---|---|---|
| 187,377 A | 2/1877 | Harder | |
| 332,022 A | 12/1885 | Todd | |
| 886,506 A | 5/1908 | Holsman | |
| 1,049,946 A | 1/1913 | Tyrell | |
| 1,405,216 A | * 1/1922 | Holmes | 280/848 |
| 1,547,059 A | 7/1925 | Massin | |
| 1,567,777 A | 12/1925 | Wampach | |
| 1,578,473 A | * 3/1926 | Schimanski | 280/854 |
| 1,613,443 A | 1/1927 | D'Amato | |
| 1,989,368 A | 1/1935 | Knapp | |
| 2,450,958 A | * 10/1948 | Hayes | 280/154 |
| 4,377,294 A | * 3/1983 | Lockwood et al. | 280/851 |
| 5,074,573 A | 12/1991 | Dick | |
| 5,169,167 A | * 12/1992 | Willson et al. | 280/157 |
| 5,511,808 A | 4/1996 | Rowland | |
| 5,950,975 A | * 9/1999 | Zieske | 248/291.1 |
| 6,336,677 B2 | * 1/2002 | Scott | 296/198 |
| 6,431,605 B1 | * 8/2002 | Miller et al. | 280/854 |
| 6,648,373 B2 | * 11/2003 | Hawes | 280/854 |

FOREIGN PATENT DOCUMENTS

| | | |
|---|---|---|
| FR | 613702 | 11/1926 |
| FR | 621678 | 5/1927 |
| FR | 686216 | 2/1930 |
| GB | 218350 | 7/1924 |
| GB | 310781 | 4/1929 |

OTHER PUBLICATIONS

Iowa Farmer Today, "Patented Fender Kit Protects Frame" 2 pages (date unknown).
John Deere, "Parts Catalog—8100, 8200, 8300, 8400 Tractors—Front fender Assembly"; 1 page; Apr. 28, 2003.
John Deere, "Parts Catalog—RXA0062391", 2 page; Apr. 10, 2003.
Midwest Fender & Supply, Inc.; "Def ender"; 1 page (date unknown).

* cited by examiner

Primary Examiner—Stephen Gordon

(57) ABSTRACT

A flexible fender mounting assembly supports a fender on a vehicle. The assembly includes a vibration isolator with a hollow housing fixed to the vehicle, a rod attached to the fender and the isolator. The isolator also has a hollow resilient member received in the housing. A rigid hollow tube is received by the resilient member and extends to an outer end spaced apart from the resilient member. The rod is received by the tube and is welded to an end of the tube. The fender has a plurality of pairs of tabs, each pair of tabs forming a slot therebetween. The rod is received by the slots and is clamped to an inner surface of the fender by a clamps.

8 Claims, 2 Drawing Sheets

FLEXIBLE FENDER MOUNT

BACKGROUND

The present invention relates to a flexible fender mount for a vehicle having a steerable wheel on an axle.

Many farm tractors have fenders for the front wheels to control the splattering of mud and snow. But, such fenders may engage a body panel or the frame of the tractor when the front wheels are turned at a sharp angle. This can cause damage to the fender or to the body panel, or it may limit the turn angle and maneuverability of the tractor. This may be especially a problem for row crop tractor which has wheels which are set narrowly for use in row crops. Various designs have been proposed in attempts to solve this problem by having the fender be pivotal with respect to the tractor. For example, U.S. Pat. No. 5,074,573 issued Dec. 24, 1991 to Dick, shows a flexible mounting for a fender for a steerable wheel wherein fender support arms are fixed to a sleeve which is rotatable on a shaft fixed to a front frame part and a torsion spring couples the sleeve to the shaft. This design includes a separate stop which is mounted on the axle and which engages a fender support arm to prevent engagement between the fender and a body panel of the tractor. This design requires the operator or a mechanic to adjust a fender stop based on tire size or tread width.

A flexible fender mount for a vehicle having a steerable wheel on an axle is described in U.S. Pat. No. 5,511,808, issued in 1996 and assigned to the assignee of this application. This fender mount has a bracket fixed to the axle, an arm fixed to the fender and a flexible bushing coupled between the bracket and the arm. The bushing is rotatably flexible about a torsion axis and is bendably flexible in directions transverse to the torsion axis. The bushing includes a flexible core and a pair of wedge-shaped end caps fixed to opposite ends of the core. The bushing has a central axis which is tilted rearwardly with respect to a fore-and-aft axis of the wheel and which is tilted away from the wheel.

Another flexible fender mount is used on production John Deere tractors. This fender mount has a housing fixed to the axle. A hollow rubber bushing is received in the housing. The bushing is molded onto the outer surface of a hollow metal bushing. A keyway is formed on an inner surface of the bushing. An end of a fender support rod is received by the bushing and is retained by a bolt which is screwed into a threaded bore in the end of the rod. The support rod end has a slot. The keyway and the slot receive a key which prevents the rod from rotating relative to the bushing. The rod is welded to a curved rigid fender bracket which is bolted to and stiffens an inner surface of the fender.

It would be desirable to have an inexpensive and simple flexible fender mount.

SUMMARY

Accordingly, an object of this invention is to provide an inexpensive flexible fender mount.

Another object of this invention is to provide a simple flexible fender mount.

These and other objects are achieved by the present invention, wherein a flexible fender mounting assembly includes an elongated rod attached to the fender and a vibration isolator. The isolator has a hollow elongated housing fixed to the vehicle, a hollow resilient member received in the housing, and a rigid cylindrical tube having a first portion received by the resilient member and a second portion projecting outwardly from the housing and the resilient member to an outer end. The second tube portion receives an end of the rod, and the outer end of the tube is bonded to an outer surface of the rod. The fender has a plurality of pairs of tabs, each pair of tabs being spaced apart to form slots for receiving the rod. Clamps are attached to an inner surface of the fender to hold the rod in the slots. The rod is bent to form a plurality of sections which extend at angles with respect to each other, and which are attached to the fender so that the fender cannot rotate with respect to the rod.

DETAILED DESCRIPTION

Figure 1:
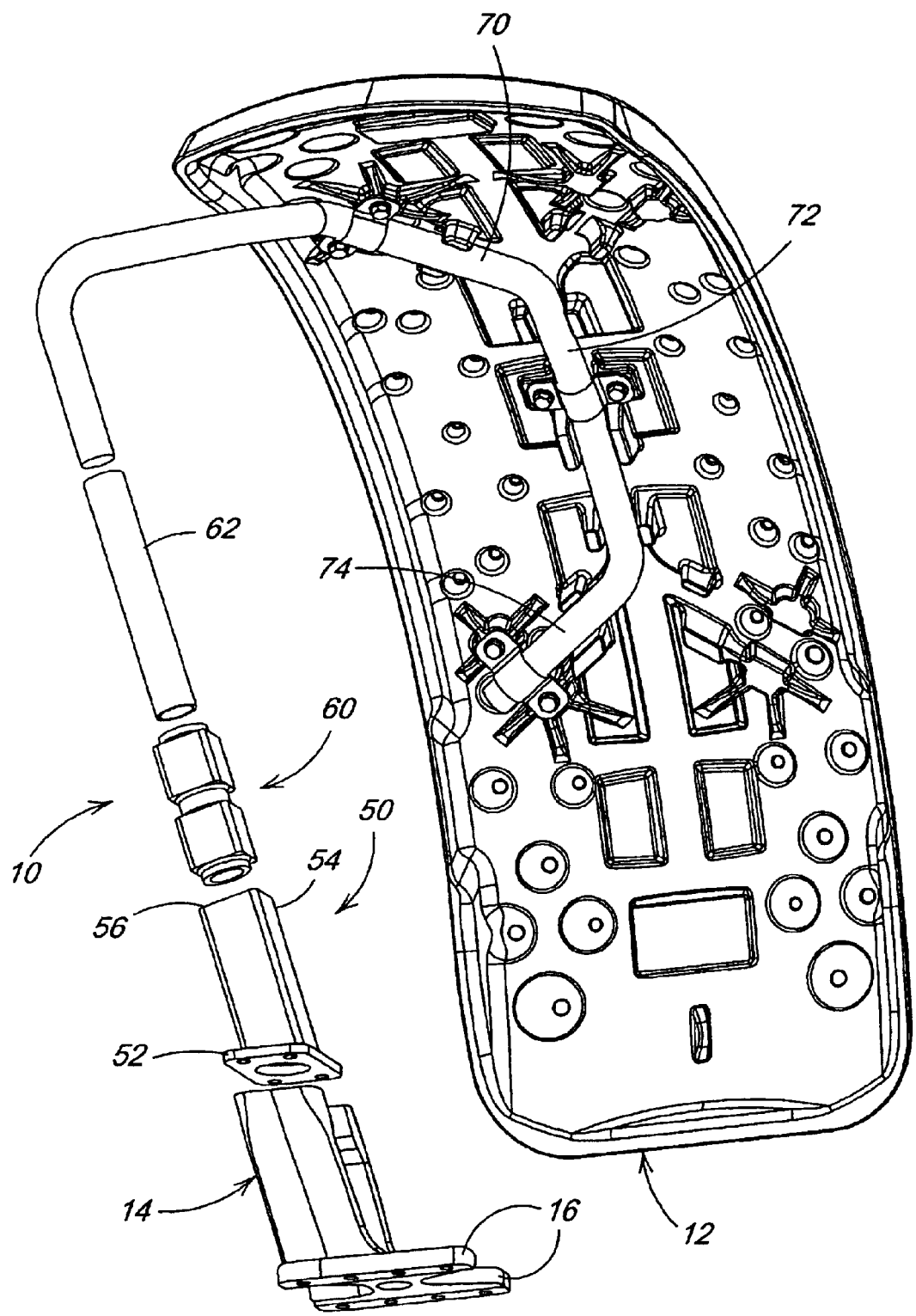
FIG. 1 is a perspective exploded view of a flexible fender mount according to the present invention.
Figure 2:
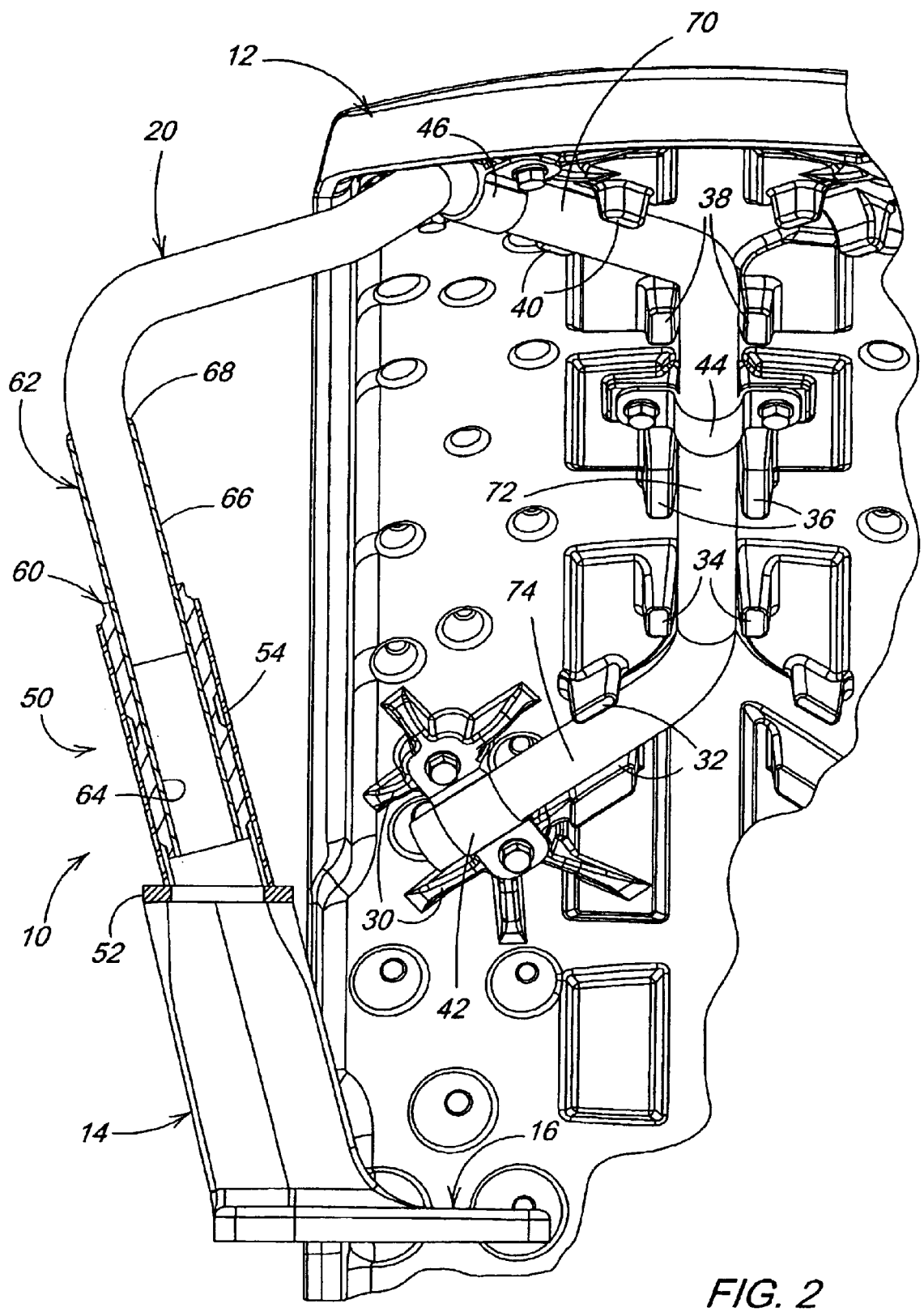
FIG. 2 is a partial sectional view of the present invention.

Referring to FIGS. 1 and 2, flexible fender mounting assembly 10 supports a fender 12 on a vehicle (not shown). The assembly 10 includes a fixed support member 14 with feet 16 which are adapted to be bolted to a portion of a vehicle axle (not shown) adjacent to a steerable wheel (not shown). Such a support member is currently used on production John Deere tractors.

An elongated cylindrical fender attaching member or rod 20 (preferably a solid rod) with multiple bends has a portion which is attached to the fender 12. The fender 12 preferably is a blow-molded hollow shell plastic which has structural rigidity and which is made of a high density polyethylene plastic material. The inner surface of fender 12 has a plurality of pairs of reinforced tabs 30, 32, 34, 36, 38 and 40. Each pair of tabs forms a slot which receives a corresponding part of the rod 20. Clamps 42, 44 and 46 are bolted to corresponding bosses formed on the inner surface of fender 12 and clamp the rod 20 to the inner surface of fender 12. The rod 20 is bent to form three sections 70, 72 and 74 which extend at angles with respect to each other, and which are attached to the fender 12 so that the fender 12 will not rotate with respect to the rod 20.

A vibration isolator 50 has a base plate 52 fixed to the support member 14 and a hollow elongated housing 54 extending from a first end fixed to the base plate 52 to a second open end 56. The housing 54 has a non-circular or polygonal (preferably rectangular or square) cross-sectional shape. A hollow resilient rubber member 60 is received in the housing 54. A rigid cylindrical tube 62 has a first portion 64 received by the resilient member 60 and a second portion 66 projecting outwardly from the housing 54 and the resilient member 60. The resilient member 60 is preferably molded to an outer surface of the first tube portion 64, and the resilient member 60 has an outer surface which conforms to the shape or inner wall of the housing 54. The second tube portion 66 receives an end of the rod 20. The second tube portion 66 has an outer end 68 which is welded to an outer surface of the support member 20.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. In a flexible fender mounting assembly for supporting a vehicle fender, the assembly having a fixed hollow housing, a hollow resilient member received by the housing, a hollow tube received by and attached to the resilient member, and a fender support rod attached to the fender and to the tube, the improvement wherein:

the tube has a first portion received by the resilient member and a second portion which projects out from the resilient member to an outer end which spaced apart from the resilient member, and said outer end is bonded to an outer surface of the fender support rod.

2. The fender mounting assembly of claim 1, wherein:

the fender has a plurality of pairs of tabs projecting from an inner surface of the fender, each pair of tabs being spaced apart to form a slot therebetween, the fender support rod being received by said slots.

3. The fender mounting assembly of claim 2, further comprising:

a plurality of clamps, each clamp being attached to an inner surface of the fender to hold the fender support rod in the slots.

4. The fender mounting assembly of claim 1, wherein:

the rod is bent to form a plurality of sections which extend at angles with respect to each other, and which are attached to the fender so that the fender cannot rotate with respect to the rod.

5. A flexible fender mounting assembly for supporting a vehicle fender, the assembly comprising:

an elongated rod having a portion attached to the fender, and a vibration isolator, the isolator having a fixed hollow elongated housing, a hollow resilient member received in the housing, a rigid cylindrical tube having a first portion received by the resilient member and a second portion projecting outwardly from the housing and the resilient member to an outer end, the second tube portion receiving an end of the rod, and said outer end is bonded to an outer surface of the rod.

6. The fender mounting assembly of claim 5, wherein:

the fender has a plurality of pairs of tabs, each pair of tabs being spaced apart to form a slot therebetween, the rod being received by said slots.

7. The fender mounting assembly of claim 6, further comprising:

a plurality of clamps, each clamp being attached to an inner surface of the fender to hold the rod in the slots.

8. The fender mounting assembly of claim 5, wherein:

the rod is bent to form a plurality of sections which extend at angles with respect to each other, and which are attached to the fender so that the fender cannot rotate with respect to the rod.

\* \* \* \* \*